US012771234B2

(12) United States Patent
Pieszala et al.

(10) Patent No.: US 12,771,234 B2
(45) Date of Patent: Oct. 20, 2026

(54) SYSTEM AND METHOD FOR CONTROLLING A MULTI-PHASE INVERTER OF AN ELECTRIC MACHINE

(71) Applicant: GM GLOBAL TECHNOLOGY OPERATIONS LLC, Detroit, MI (US)

(72) Inventors: Michael Z. Pieszala, Panama City, FL (US); Benjamin S. Ngu, Royal Oak, MI (US); Khorshed Mohammed Alam, Canton, MI (US); Yilun Luo, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 267 days.

(21) Appl. No.: 18/634,618

(22) Filed: Apr. 12, 2024

(65) Prior Publication Data

US 2025/0323583 A1 Oct. 16, 2025

(51) Int. Cl.
*H02M 1/088* (2006.01)
*H02M 1/00* (2006.01)
(Continued)

(52) U.S. Cl.
CPC ......... *H02M 1/088* (2013.01); *H02M 1/0029* (2021.05); *H02M 1/0054* (2021.05); *H02M 7/53875* (2013.01); *H02P 27/08* (2013.01); *H02M 7/5387* (2013.01); *H02M 7/5395* (2013.01)

(58) Field of Classification Search
CPC ............. H02M 1/0029; H02M 1/0054; H02M 1/08–096; H02M 1/32; H02M 1/44; H02M 7/537–5395; H02H 7/1225; H02P 27/08
See application file for complete search history.

(56) References Cited

U.S. PATENT DOCUMENTS 10,495,050 B2 12/2019 Alpe
10,505,538 B1 * 12/2019 Alam .............. H03K 19/00369
(Continued)

FOREIGN PATENT DOCUMENTS

CN 115642791 A 1/2023
DE 10356468 A1 10/2004
(Continued)

*Primary Examiner* — Fred E Finch, III
(74) *Attorney, Agent, or Firm* — Quinn IP Law

(57) ABSTRACT

A control system for a power inverter includes a gate controller, a gate drive circuit, and a hybrid switch power module that is integrated into a phase leg of the power inverter. The hybrid switch power module includes a first semiconductor switch connected in parallel with a second semiconductor switch. The gate drive circuit includes a gate driver, a first variable resistance circuit, and a second variable resistance circuit. The gate controller generates a first control signal for controlling the first semiconductor switch. The first control signal is selected to achieve a first switching transient in the first semiconductor switch. The gate controller generates a second control signal for controlling the second semiconductor switch. The second control signal is selected to achieve a second switching transient in the second semiconductor switch. The gate controller generates the first and second control signals to synchronize the first and second switching transients.

20 Claims, 5 Drawing Sheets

(51) Int. Cl.

| | |
|---|---|
| ***H02M 7/5387*** | (2007.01) |
| ***H02P 27/08*** | (2006.01) |
| *H02M 7/5395* | (2006.01) |

(56) References Cited

U.S. PATENT DOCUMENTS

| | | | | |
|---|---|---|---|---|
| 10,931,276 | B1 * | 2/2021 | Suh | H03K 17/602 |
| 12,362,742 | B1 * | 7/2025 | Pieszala | H03K 17/122 |
| 2004/0196678 | A1 * | 10/2004 | Yoshimura | H03K 17/168<br>363/79 |
| 2014/0001839 | A1 * | 1/2014 | Kakimoto | H02M 7/53871<br>307/9.1 |
| 2018/0159521 | A1 * | 6/2018 | Tsurumaru | H03K 17/166 |
| 2018/0212545 | A1 | 7/2018 | Xu et al. | |
| 2018/0375508 | A1 * | 12/2018 | Morisaki | H03K 17/0822 |
| 2020/0076292 | A1 * | 3/2020 | Tomisawa | H02M 1/08 |
| 2020/0186140 | A1 * | 6/2020 | Hiyama | H03K 17/0828 |
| 2020/0350907 | A1 * | 11/2020 | Watanabe | H03K 17/30 |
| 2022/0263404 | A1 | 8/2022 | Volke et al. | |
| 2022/0416782 | A1 | 12/2022 | Akiyama et al. | |
| 2023/0179196 | A1 | 6/2023 | Yamamoto | |
| 2024/0259015 | A1 * | 8/2024 | Matsumoto | H03K 17/168 |

FOREIGN PATENT DOCUMENTS

| | | | |
|---|---|---|---|
| DE | 102011108495 | A1 | 9/2012 |
| DE | 102013212262 | A1 | 1/2014 |
| DE | 102016217494 | A1 | 3/2018 |
| DE | 112017004119 | T5 | 5/2019 |
| DE | 112018002634 | T5 | 4/2020 |
| DE | 112018004716 | T5 | 6/2020 |
| DE | 102022119439 | A1 | 3/2023 |
| DE | 102022120996 | A1 | 2/2024 |
| EP | 0664613 | A2 | 7/1995 |
| WO | WO02052726 | A1 | 7/2002 |
| WO | 2023079820 | A1 | 5/2023 |

* cited by examiner

SYSTEM AND METHOD FOR CONTROLLING A MULTI-PHASE INVERTER OF AN ELECTRIC MACHINE

INTRODUCTION

The present disclosure relates to systems for controlling an electric machine, including elements related to operating a multi-phase power inverter to provide electrical power to a traction motor of an electric vehicle.

In a power inversion process, pulse width modulation (PWM), pulse density modulation, delta-sigma modulation, pulse-frequency modulation, or other application-suitable binary (ON/OFF) switching control signals may be employed to facilitate transitions of switches between different states for purposes of powering an electric machine. The control signals, for example, may alternate a conducting state of the switches to convert direct current (DC) electrical power to alternating current (AC) electrical power to power the electric machine. Examples of switches used in higher power applications, such as those used for electrically powering a traction motor of an electric vehicle, may be voltage and/or current controlled devices that switch between ON and OFF states. Examples include wide bandgap (WBG), Gallium Nitride (GaN), Silicon Carbide (SiC), and other semiconductor switches, such as Metal Oxide Field Effect transistor (MOSFET) and Insulated Gate Bipolar Transistor (IGBT) semiconductor switches, which may be capable of supporting a wide variety of switching events. The rate, speed, timing, etc. of the switching events, or more specifically the transitioning of the switches between ON and OFF states (or opened and closed states), may be characterized as a slew rate. There may be benefits to having an ability to select and control the slew rate to minimize second order effects, such as overvoltage spikes, electromagnetic interference (EMI) bearing current, voltage overshoot, etc.

SUMMARY

The concepts described herein provide a system, method, and apparatus for controlling semiconductor switches including hybrid switch power modules, such as may be employed in a multi-phase power inverter. The semiconductor switches may be arranged in parallel or series, wherein the semiconductor switches have different semiconductor technologies. The first and second semiconductor switches are controlled in a manner that coordinates or synchronizes current conductions during ON/OFF transitions and OFF/ON transitions by taking into account differences in gate voltages, thus providing overcurrent protection, overvoltage protection, and simplification of pulsewidth-modulation (PWM) control of semiconductor switches of hybrid switch power modules.

This system and method provide compensation for different operating characteristics of the different technologies employed in a hybrid switch power module, such as differences in switching delays or latencies of the individual switches employed therein, to ensure the switching of the first semiconductor switch and the switching of the second semiconductor switch are synchronized so that timing of current conduction therein is equivalent during ON/OFF transients and during OFF/ON transients.

This is achieved by using a gate driver with at least two sets of gate outputs for each of the types of semiconductor switches. The gate outputs for each of the switch are operated individually, or in parallel for a total of at least three different slew rate settings per semiconductor switch type.

An aspect of the disclosure may include a control system for a multi-phase power inverter that includes a gate controller, a gate drive circuit, and a hybrid switch power module, wherein the hybrid switch power module is integrated into a phase leg of the multi-phase power inverter. The hybrid switch power module includes a first semiconductor switch connected in parallel with a second semiconductor switch between a power rail and an AC power link of the phase leg of the multi-phase power inverter. The first semiconductor switch has a first set of performance characteristics, and the second semiconductor switch has a second set of performance characteristics that differ at least partially from the first set of performance characteristics. The gate drive circuit includes a gate driver, a first variable resistance circuit that is operatively connected to the first semiconductor switch, and a second variable resistance circuit that is operatively connected to the second semiconductor switch. The gate controller generates a first control signal for controlling the first semiconductor switch via the gate driver and the first variable resistance circuit. The first control signal is selected to achieve a first switching transient in the first semiconductor switch. The gate controller generates a second control signal for controlling the second semiconductor switch via the gate driver and the second variable resistance circuit. The second control signal is selected to achieve a second switching transient in the second semiconductor switch. The gate controller generates the first control signal and the second control signal to synchronize the first switching transient in the first semiconductor switch with the second switching transient in the second semiconductor switch.

Another aspect of the disclosure may include the first control signal for controlling the first semiconductor switch to achieve the first switching transient in the first semiconductor switch being a first slew rate, and the second control signal for controlling the second semiconductor switch to achieve the second switching transient in the second semiconductor switch being a second slew rate; wherein the gate controller controls the first slew rate and the second slew rate to synchronize the first switching transient in the first semiconductor switch with the second switching transient in the second semiconductor switch.

Another aspect of the disclosure may include the gate controller generating the first control signal to control the first variable resistance circuit to control the first slew rate to achieve the first switching transient in the first semiconductor switch; and the gate controller generating the second control signal to control the second variable resistance circuit to control the second slew rate to achieve the second switching transient in the second semiconductor switch.

Another aspect of the disclosure may include the first switching transient being a first time-rate change in voltage (dV/dt) across the first semiconductor switch, and the second switching transient being a second time-rate change in voltage (dV/dt) across the second semiconductor switch.

Another aspect of the disclosure may include first switching transient being a first time-rate change in current (dI/dt) across the first semiconductor switch, and the second switching transient being a second time-rate change in current (dI/dt) across the second semiconductor switch.

Another aspect of the disclosure may include the first control signal for controlling the first semiconductor switch to achieve the first switching transient in the first semiconductor switch being a first pulsewidth-modulated (PWM)

signal, the second control signal for controlling the second semiconductor switch to achieve the second switching transient in the second semiconductor switch being a second PWM signal, and the gate controller controlling the first PWM signal and the second PWM signal to synchronize the first switching transient in the first semiconductor switch with the second switching transient in the second semiconductor switch.

Another aspect of the disclosure may include the gate controller generating the first control signal to control the first PWM signal to achieve the first switching transient in the first semiconductor switch, and the gate controller generating the second control signal to control the second PWM signal to achieve the second switching transient in the second semiconductor switch.

Another aspect of the disclosure may include the first PWM signal having a first frequency and a first duty cycle, the second PWM signal having a second frequency and a second duty cycle, wherein the first frequency is equal to the second frequency, the first duty cycle is equal to the second duty cycle, and the first duty cycle lags the second duty cycle.

Another aspect of the disclosure may include the first PWM signal having a first frequency and a first duty cycle, the second PWM signal having a second frequency and a second duty cycle, the first frequency being equal to the second frequency, the first duty cycle being equal to the second duty cycle, and the first duty cycle leading the second duty cycle.

Another aspect of the disclosure may include the first PWM signal having a first frequency and a first duty cycle, the second PWM signal having a second frequency and a second duty cycle, the first frequency being equal to the second frequency, and the first duty cycle being greater than the second duty cycle.

Another aspect of the disclosure may include the first PWM signal having a first frequency and a first duty cycle, the second PWM signal having a second frequency and a second duty cycle, the first frequency being equal to the second frequency, and the first duty cycle being less than the second duty cycle.

Another aspect of the disclosure may include the first semiconductor switch of the hybrid switch power module being an Insulated Gate Bipolar Transistor (IGBT), and second semiconductor switch being a Metal-Oxide-Semiconductor Field-Effect Transistor (MOSFET).

Another aspect of the disclosure may include the first semiconductor switch of the hybrid switch power module being a silicon-based device, and wherein the second semiconductor switch being a wide bandgap (WBG) device.

Another aspect of the disclosure may include the first semiconductor switch and/or the second semiconductor switch being an IGBT device, a MOSFET device, a junction FET (JFET) device, a high electron mobility (HMET) device, a super junction FET device, or another high-voltage switch technology.

Another aspect of the disclosure may include the power rail being a positive high-voltage power link, wherein the hybrid switch power module is connected between the positive high-voltage power link and the AC power link of the phase leg of the multi-phase power inverter.

Another aspect of the disclosure may include the power rail being a negative high-voltage power link, wherein the hybrid switch power module is connected between the negative high-voltage power link and the AC power link of the phase leg of the multi-phase power inverter.

Another aspect of the disclosure may include the first switching transient in the first semiconductor switch being an ON/OFF transition, and the second switching transient in the second semiconductor switch being an ON/OFF transition.

Another aspect of the disclosure may include the first switching transient in the first semiconductor switch being an OFF/ON transition, and the second switching transient in the second semiconductor switch being an OFF/ON transition.

Another aspect of the disclosure may include a vehicle system that includes a gate drive system, a multi-phase power inverter, and an electric machine, wherein the multi-phase power inverter is operatively connected to the electric machine via a plurality of phase legs. The gate drive system includes a gate controller, a gate drive circuit, and a plurality of hybrid switch power modules, with the hybrid switch power modules integrated into the plurality of phase legs of the multi-phase inverter. Each of the hybrid switch power modules includes a first semiconductor switch connected in parallel with a second semiconductor switch between a power rail and an AC power link of the phase leg of the multi-phase inverter, the first semiconductor switch having a first set of performance characteristics and the second semiconductor switch having a second set of performance characteristics differing at least partially from the first set of performance characteristics. The gate drive circuit includes a gate driver, a first variable resistance circuit that is operatively connected to the first semiconductor switch, and a second variable resistance circuit that is operatively connected to the second semiconductor switch. The gate controller generates a first control signal for controlling the first semiconductor switch via the gate driver and the first variable resistance circuit, the first control signal selected to achieve a first switching transient in the first semiconductor switch, and generates a second control signal for controlling the second semiconductor switch via the gate driver and the second variable resistance circuit, the second control signal selected to achieve a second switching transient in the second semiconductor switch. The gate controller generates the first control signal and the second control signal to synchronize the first switching transient in the first semiconductor switch with the second switching transient in the second semiconductor switch.

The above summary is not intended to represent every possible embodiment or every aspect of the present disclosure. Rather, the foregoing summary is intended to illustrate some of the aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which:

FIGS. 7-1, 7-2, 7-3, and 7-4 graphically illustrate examples of first and second PWM control signals respectively, for controlling the first and second PWM commands for the first and second semiconductor switches of an embodiment of the hybrid switch power module during a single PWM cycle, in accordance with the disclosure.

Figure 1:
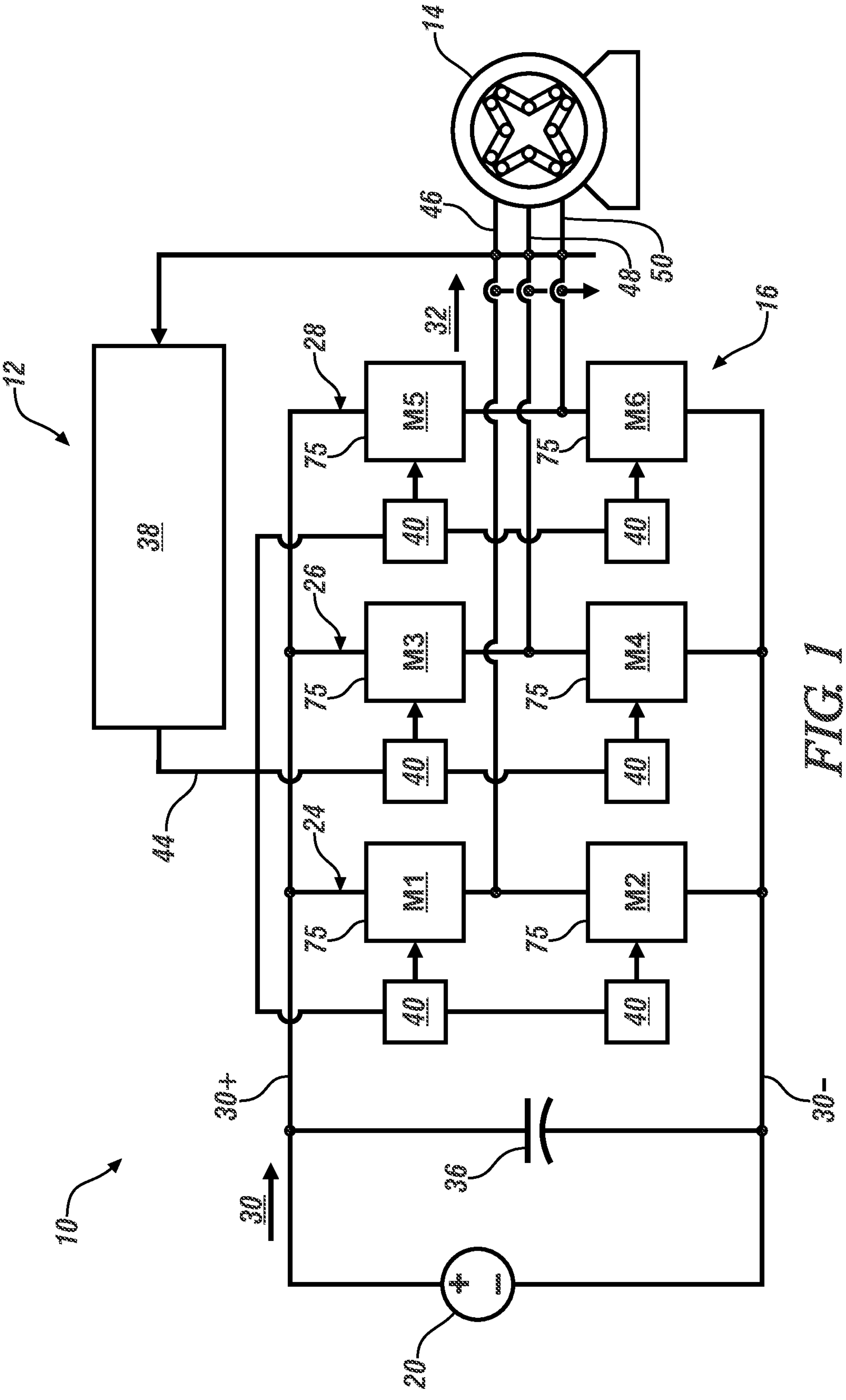
FIGS. 1 and 2 schematically illustrate details related to an embodiment of an Electric Power System (EPS) that includes a rechargeable electric energy storage system (RESS), a gate drive system, a multi-phase power inverter (PIM), and a multi-phase rotary electric motor/generator (electric machine), in accordance with the disclosure.

The appended drawings are in simplified form and are not to precise scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The use of ordinals such as first, second and third does not necessarily imply a ranked sense of order, but may distinguish between multiple instances of an act or structure.

The following detailed description is merely illustrative in nature and is not intended to limit the application and uses. Furthermore, there is no intention to be bound by an expressed or implied theory presented herein. Throughout the drawings, corresponding reference numerals indicate like or corresponding elements and features.

Detailed embodiments of the present disclosure may be disclosed herein; however, it may be understood that the disclosed embodiments may be merely illustrative of the disclosure that may be embodied in various and alternative forms. The figures may not be necessarily to scale; some features may be exaggerated or minimized to show details of particular components. Therefore, specific structural and functional details disclosed herein may need not to be interpreted as limiting, but merely as a representative basis for teaching one skilled in the art to variously employ the present disclosure.

The present disclosure is susceptible of being embodied in various forms. Representative examples of the disclosure are shown in the drawings and described herein in detail as non-limiting examples thereof. To that end, elements and limitations described herein, but not explicitly set forth in the claims, are not to be incorporated into the claims, singly or collectively, by implication, inference, or otherwise.

For purposes of the present description, unless specifically disclaimed, use of the singular includes the plural and vice versa, the terms “and” and “or” shall be both conjunctive and disjunctive, and the words “including,” “containing,” “comprising,” “having,” and the like shall mean “including without limitation.” Moreover, words of approximation such as “about,” “almost,” “substantially,” “generally,” “approximately,” etc., may be used herein in the sense of “at, near, or nearly at,” or “within 0-5% of,” or “within acceptable manufacturing tolerances,” or logical combinations thereof.

As used herein, the term “system” refers to mechanical and electrical hardware, software, firmware, electronic control componentry, processing logic, and/or processor device, individually or in combination, including without limitation: application specific integrated circuit (ASIC), an electronic circuit, a processor (shared, dedicated, or group) that executes one or more software or firmware programs, memory device(s) that electrically store software or firmware instructions, a combinatorial logic circuit, and/or other components that provide the described functionality.

As employed herein, terms such as “vertical”, “horizontal”, “left”, “right”, “upper”, “lower”, “top”, “bottom” and similar expressions are non-limiting terms that merely describe the various elements as illustrated in the Figures, and are not intended to limit the scope of the disclosure.

As used herein, the term “electric machine” refers to a rotary electric motor/generator device including a rotor and a stator that is capable of converting electric power to mechanical power and/or converting mechanical power to electric power by electromagnetic effort.

The term “controller” and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical, or electromagnetic), such as DC, AC, sinusoidal-wave, triangular-wave, square-wave, vibration, and the like, that is capable of traveling through a medium.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

The use of ordinals such as first, second and third does not necessarily imply a ranked sense of order, but rather may distinguish between multiple instances of an act or structure.

Figure 2:
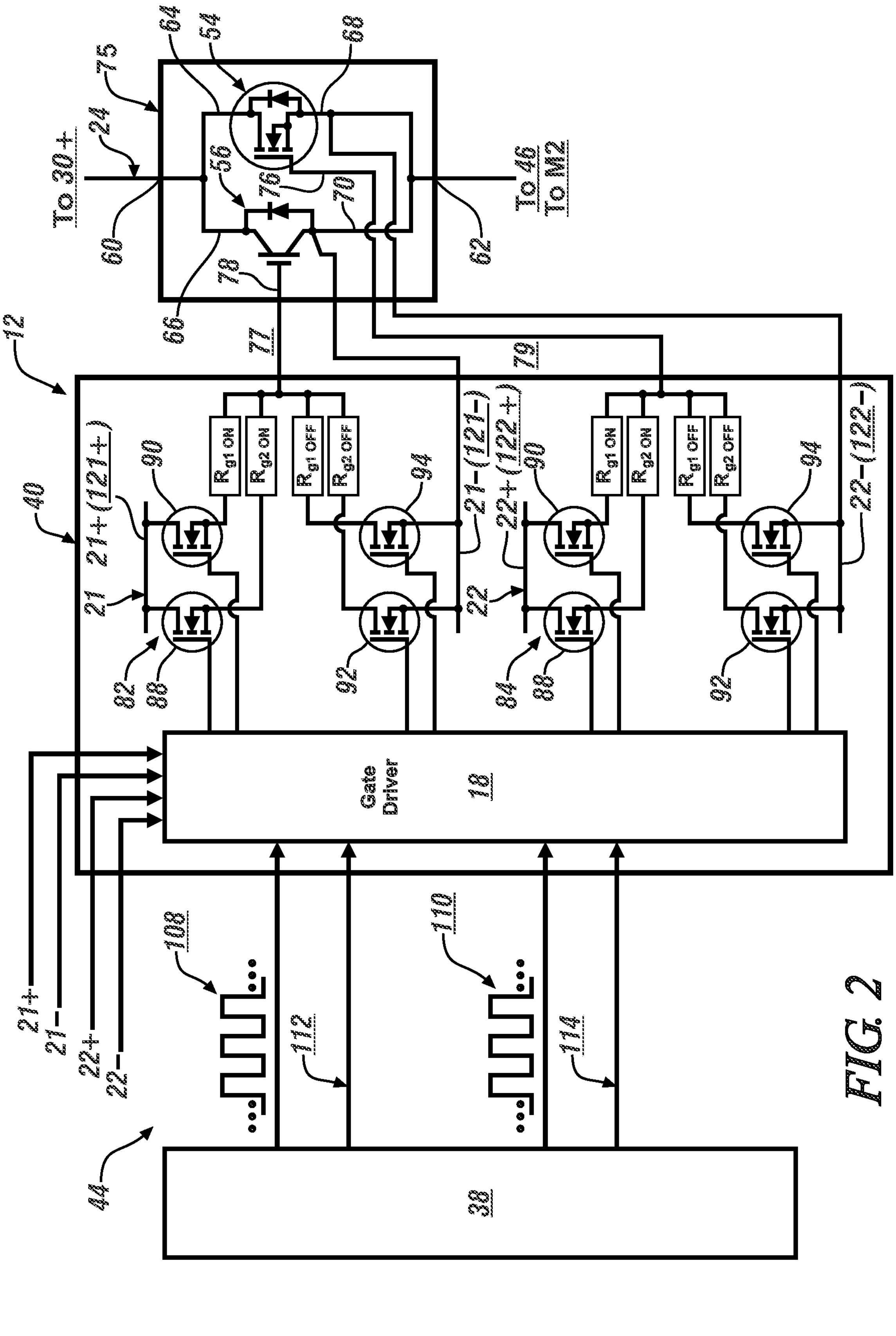

Referring to the drawings, wherein like reference numbers refer to the same or like components in the several Figures, FIGS. 1 and 2 schematically illustrate details related to an embodiment of an Electric Power System (EPS) 10 that includes a rechargeable electric energy storage system (RESS) 20, a gate drive system 12, a multi-phase power inverter (PIM) 16, and a multi-phase rotary electric motor/generator (electric machine) 14. The EPS 10 is capable of converting DC electric power to AC electric power to generate torque via the electric machine 14, and is capable of regeneratively reacting torque input from the electric machine 14 to generate DC electric power that is storable on the RESS 20.

The RESS 20 connects to the PIM 16 via a high-voltage power bus 30 that includes a positive high-voltage DC power rail (HV+) 30+ and a negative high-voltage DC power rail (HV−) 30−.

The PIM 16 is a multi-phase power inverter, which may include, by way of non-limiting examples, a two-phase inverter, a three-phase inverter, a four-phase inverter, etc. As shown and described herein, the PIM 16 is a three-phase power inverter. The PIM 16 includes a plurality of phase legs that have a plurality of hybrid switch power modules 75, indicated as M1, M2, M3, M4, M5 and M6. The PIM 16 is arranged with a first phase leg 24, a second phase leg 26, and a third phase leg 28. The first phase leg 24 is composed of a pair of the hybrid switch power modules M1, M2 that are arranged in series between HV+ 30+ and HV− 30−, and are connected at a first node that connects via a first AC power link 46 to a first phase of the electric machine 14. The second phase leg 26 is composed of hybrid switch power modules M3, M4 that are arranged in series between HV+ 30+ and HV− 30−, and are connected at a second node that connects via a second AC power link 48 to a second phase of the electric machine 14. The third phase leg 28 is composed of hybrid switch power modules M5, M6 that are arranged in series between HV+ 30+ and HV− 30−, and are connected at a third node that connects via a third AC power link 50 to a third phase of the electric machine 14.

The gate drive system 12 controls operation of the PIM 16, and thus controls operation of the electric machine 14. The electric machine 14 may be of the type employed within a vehicle, such as an electric vehicle, to provide mechanical, tractive torque that is useable to propel the vehicle or otherwise perform work.

The gate drive system 12 includes a gate controller 38, and a plurality of gate drive circuits 40, wherein the gate drive circuits 40 are arranged to individually control the plurality of hybrid switch power modules 75 between opened and closed states to facilitate converting a direct current (DC) output 30 of the RESS 20 to a plurality of alternating current (AC) inputs that are transferred to the electric machine 14 via the first, second, and third AC power links 46, 48, 50, respectively.

The gate controller 38 generates a plurality of control signals 44 to individually control the plurality of gate drive circuits 40, and thus individually control activation and deactivation of the plurality of hybrid switch power modules 75 in response to a request for output torque from the electric machine 14. Additional details related to the gate controller 38, the plurality of gate drive circuits 40, and the control signals associated therewith, e.g., pulsewidth modulated (PWM) control signals and slew rate control signals, are described with reference to FIG. 2, et seq.

Referring again to FIG. 1, the RESS 20 may be a battery or other energy storage device capable of supplying electrical power to and receiving electrical power from the electric machine 14 via the PIM 16. A DC link capacitor 36 may be included to smooth, filter, and otherwise process the DC output 30 for use with the PIM 16. The gate controller 38 of the gate drive system 12 may individually and specifically control the plurality of gate drive circuits 40 to control a rate, speed, timing, etc. of switching events for the hybrid switch power modules 75, including those used to control transitioning of the hybrid switch power modules 75 between ON and OFF or opened and closed states. The transitioning of the hybrid switch power modules 75 between states may be performed according to corresponding plurality of control signals 44 provided from the gate controller 38. The gate controller 38 may be configured for individually providing the plurality of control signals 44 to each of the gate drive circuits 40. The gate controller 38 may include a non-transitory computer-readable storage medium having a plurality of non-transitory instructions stored thereon, which when executed with an associated one or more processors, may be operable in accordance with the present disclosure to facilitate generating the plurality of control signals 44 in a manner that provides a desirable slew rate while also managing the AC input 32 as needed for proper powering of the electric machine 14. The gate controller 38 may be used in this manner to facilitate switching events for the hybrid switch power modules 75 whereby the DC output 30 may be converted to the AC input 32. The AC input 32 may be generated in the illustrated manner to provide a polyphase output having a plurality of AC power links 46, 48, 50 that couple to the electric machine 14, which are shown for non-limiting purposes to correspond with a three-phase implementation where a three-phase AC input 32 is provided to an AC bus or windings of the electric machine 14, such as via a corresponding input terminal for the associated AC input 32.

FIG. 2 illustrates a partial schematic view of an embodiment of the gate drive system 12 and PIM 16 of the EPS 10, including one of the gate drive circuits 40 and a first of the first hybrid switch power modules M1 75. The circuit topology and configuration are representative of how each of the plurality of gate drive circuits 40 may be arranged and controlled to interact with each of the other hybrid switch power modules 75, i.e., hybrid switch power modules M2, . . . M6. The gate drive system 12 includes gate controller 38, gate drive circuit 40, and hybrid switch power module 75, which connects between one of the positive power rail 30+ (as illustrated) or the negative power rail 30−, and to one of the AC power links 46, 48, 50 of the electric machine 14, as shown with reference to FIG. 1.

Referring again to FIG. 2, the gate controller 38 generates the plurality of control signals 44 that are communicated to the plurality of gate drive circuits 40 to individually control activation and deactivation of the plurality of hybrid switch power modules 75 in response to a request for output torque from the electric machine 14. The plurality of control signals 44 may be communicated to the plurality of gate drive circuits 40 via one or more of direct wired point-to-point links including direct wired point-to-point discrete links, direct wired point-to-point digital links, etc., or serial peripheral interface (SPI) links, wireless links, etc. The plurality of control signals 44 provided to each of the plurality of gate drive circuits 40 include a first PWM control signal 108 and a first slew rate signal 112 for controlling the first semiconductor switch 56 between ON and OFF states, and a second PWM control signal 110 and a second slew rate signal 114 for controlling the second semiconductor switch 54 between ON and OFF states.

Each of the gate drive circuits 40 includes a gate driver 18 that connects to and controls first and second variable resistance circuits 82, 84, respectively, to control the respective hybrid switch power module 75.

Each of the hybrid switch power modules 75 includes two or more semiconductor switches 56, 54, wherein the switches 56, 54 have differing performance characteristics. The illustrated example includes the hybrid switch power module 75 having a first semiconductor switch (Q1) 56 connected in parallel with a second semiconductor switch (Q2) 54. It is appreciated that there may be three or more semiconductor switches connected in parallel within the scope of the disclosure. The first and second semiconductor switches 56, 54 are shown to be connected in parallel for illustrative purposes as the present disclosure fully contemplates the switches 56, 54 being connected in series and/or additional switches being employed, with the additional switches being connected in series and/or in parallel with each other. The first and second semiconductor switches 56, 54 may be of a different technology such that the first semiconductor switches 56 may have a first set of performance characteristics and the second semiconductor switches 54 may have a second set of performance characteristics differing at least in part from the first set of performance characteristics. One aspect of the present disclosure contemplates varying slew rates of the semiconductor switches 56, 54 to optimize the DC-to-AC conversion, optionally by leveraging use of the differing performance characteristics of the semiconductor switches 56, 54 according to those most suitable for the present operating conditions of the electric machine.

In one operating state, the first and second semiconductor switches 56, 54 are activated substantially simultaneously in accordance with the concepts described herein. In one operating state, one of the first and second semiconductor switches 56, 54 is activated, e.g., is pulsewidth-modulation controlled, and the other of the first and second semiconductor switches 56, 54 is deactivated, i.e., is controlled to an OFF state.

The first and second semiconductor switches 56, 54 may be composed of various semiconductors or other types of switches 56, 54 having differing technologies. This may include but not be limited to the first semiconductor switches 56 being Metal-Oxide-Semiconductor Field-Effect Transistors (MOSFETs) or Silicon Carbide (SIC) MOSFETs, the second semiconductor switches 54 being Insulated Gate Bipolar Transistors (IGBTs) or Si IGBTs, and/or according to other differences, e.g., the first semiconductor switches 56 may be silicon type devices, and the second semiconductor switches 54 may be wide bandgap (WBG) type devices, wherein the WBG devices may be the same device in one embodiment, or may be different technologies in one embodiment. In this configuration, the first set of performance characteristics may correspond with a first switching speed rating, a first voltage rating, a first current rating, and/or a first efficiency rating, and the second set of performance characteristics may correspond with a second switching speed rating, a second voltage rating, a second current rating, and/or a second efficiency rating. The first switching speed rating may be faster than the second switching speed rating, the first voltage rating may be less than the second voltage rating, the first current rating may be less than the second current rating, and/or the first efficiency rating may be greater than the second efficiency rating. The gate controller 38 may utilize these performance differences to control transitioning of the first and second semiconductor switches 56, 54 between ON and OFF states according to variable slew rates.

The hybrid switch power modules 75 may be individually fabricated as discrete or separate integrated circuits (IC), which may be packaged in a corresponding housing. The hybrid switch power modules 75 may each employ separate ICs for the first and second semiconductor switches 56, 54 and/or additional switches included thereon. The hybrid switch power modules 75 may include pins, traces, or other physical constructs to facilitate the electrical interconnections contemplated herein. While other arrangements are contemplated, the hybrid switch power modules 75 are shown to include an input 60 and an output 62 to the associated phase leg 24, a drain 64 of the first semiconductor switch 56 connected to a collector 66 of the second semiconductor switch 54, a source 68 of the first semiconductor switch 56 connected to an emitter 70 of the second semiconductor switch 54, and a plurality of interfaces operable with the gate drive circuits 40 to facilitate biasing a gate 78 of the first semiconductor switch 56 and biasing a second gate 76 of the second semiconductor switch 54.

Each gate drive circuit 40 includes first and second variable resistance circuits 82, 84, respectively, for controlling a respective hybrid switch power module 75. The variable resistance circuits 82, 84 may each include a plurality of buffer switches 88, 90, 92, 94 and a plurality of resistors including two ON resistors $R_{Gg1\_ON}$, $R_{g2\_ON}$ and two OFF resistors $R_{g1\_OFF}$, $R_{g2\_OFF}$. The buffer switches 88, 90, 92, 94 may be operable between ON and OFF states to respectively connect and disconnect an associated one or more of the resistors to first and second low-voltage DC power buses 21, 22, respectively. The illustrated configuration includes each of the first and second variable resistance circuits 82, 84 including two ON buffer switches 88, 90 and two OFF buffer switches 92, 94, respectively, for connecting and disconnecting two ON resistors $R_{G1\_ON}$, $R_{G2\_ON}$ and two OFF resistors $R_{G1\_OFF}$, $R_{G2\_OFF}$ to the positive and/or negative power rails 21, 22 and first and second gates 78, 76, respectively, of the corresponding first and second semiconductor switches 56, 54. The aforementioned elements of first variable resistance circuit 82 are powered via the first low voltage DC power bus 21 including a positive rail 21+ and a negative rail 21−, and the aforementioned elements of the second variable resistance circuit 84 are powered via second low voltage DC power bus 22 including a positive rail 22+ and a negative rail 22−. The gate driver 118 controls positive and negative DC voltage levels of the positive rail 21+ and negative rail 21−, respectively, of the first low voltage power bus 21, and controls positive and negative DC voltage levels of the positive rail 22+ and negative rail 22−, respectively, of the second low voltage power bus 22.

In one embodiment, the positive DC voltage level of the positive rail 21+ of the first low voltage power bus 21 differs from the positive DC voltage level of the positive rail 22+ of the second low voltage power bus 22.

In one embodiment, the positive DC voltage level of the positive rail 21+ of the first low voltage power bus is the same as the positive DC voltage level of the positive rail 22+ of the second low voltage power bus.

In one embodiment, the negative DC voltage level of the negative rail 21− of the first low voltage power bus differs from the negative DC voltage level of the negative rail 22− of the second low voltage power bus.

In one embodiment, the negative DC voltage level of the negative rail 21− of the first low voltage power bus is the same as the negative DC voltage level of the negative rail 22− of the second low voltage power bus.

The gate controller 38 may be configured to generate the plurality of control signals 44 to provide each gate drive circuit 40 with corresponding first and second PWM control signals 108, 110 for respectively controlling the first and second semiconductor switches 56, 54 between ON and OFF states, i.e., PWM control, and first and second slew rate signals 112, 114 for respectively controlling first and second slew rates of the first and second semiconductor switches 56, 54. Specifically, and in one embodiment, the first variable resistance circuit 82 generates a first gate voltage 77 that is input to first gate 78 for controlling the first semiconductor switch 56 based upon the first PWM control signal 108 and the first slew rate signal 112, and the second variable resistance circuit 84 generates a second gate voltage 79 that is input to second gate 76 for controlling the second semiconductor switch 54 based upon the second PWM control signal 110 and the second slew rate signal 114.

As described herein, the control of one of, some of, or all of the first and second PWM control signals 108, 110 and the first and second slew rate signals 112, 114 is to synchronize the first switching transient in the first of the first and second semiconductor switches 56, 54 with the second switching transient in the second of the first and second semiconductor switches 56, 54 of the hybrid switch power module 75 such that the current load being carried by the first of the switches is equal to the current load being carried by the second switch during ON/OFF transients and during ON/OFF transients. Stated another way, the control of one of, some of, or all of the first and second PWM control signals 108, 110 and the first and second slew rate signals 112, 114 is to balance a first current load across the first semiconductor switch with a second current load across the second semiconductor switch during an activation-to-deactivation transition and during a deactivation-to-activation transition in each of the hybrid switch power module 75.

The gate drive circuit 40 includes the gate driver 118, which is operable for processing the first and second PWM control signals 108,110 and the first and second slew rate signals 112, 114 to implement the desired control via the variable resistance circuits 82, 84. The gate driver 118 may process the first and second slew rate signals 112, 114 to determine the desired combinations of the ON and OFF resistors and process the control signals 108, 110 to determine desired timing of the buffer switches 88, 90, 92, 94 between ON and OFF states. While the present disclosure fully contemplates additional ON and OFF resistors and/or ON and OFF buffer switches 88, 90, 92, 94 being employed to facilitate additional resistor combinations, the illustrated configuration provides three different resistance combinations for each of the ON and OFF resistors, i.e., ON resistors $R_{g1\_ON}$, $R_{g2\_ON}$ and OFF resistors $R_{g1\_OFF}$, $R_{g2\_OFF}$. A duty cycle of the control signals 108, 110, which are shown to be pulse width modulated (PWM) signals. The PWM signal includes a frequency component and a duty cycle component, wherein the duty cycle component may be varied to finely adjust the gate voltage and/or current at precise levels depending on the desired slew rate, e.g., to facilitate adjusting the slew rate in real-time according to desired operation of the electric machine 14. While not shown in individual detail, a plurality of sensors or other features may be employed to facilitate measuring or otherwise determining a DC voltage of the DC source 20, a temperature of the DC link capacitor 36, a current of one or more of the AC inputs 32, and a junction temperature, a maximum discharge time, a drain-source voltage (Vds), a voltage threshold (Vth) of the hybrid switch power modules, i.e., hybrid switch power modules M1, M2, . . . M6.

The gate controller 38 may process the sensor measurements, metrics, etc. to determine a desired slew rate for each of the hybrid switch power modules 75, which may include selecting the plurality of control signals 44 to optimize transitions between the opened and closed states as a function of operating conditions of the electric machine 14 and the first and second sets of performance characteristics.

The gate controller 38 may employ temperature (simulated, calculated, or measured) as an operating parameter for each semiconductor switch technology. By way of a non-limiting example, the semiconductor switches 56, 54 may have different performance characteristics, which may be employed as inputs that allow for temperature warning, shutdown limits, or protection for slew rate usages. The gate controller 38 may include a slew rate selection process based on individual or combinations of operating conditions such as, but not limited to: inverter terminal voltage, RESS open circuit voltage, RESS terminal, semiconductor switch temperature (measured or estimated), inverter output current, motor torque, motor speed, PWM frequency, PWM modulation type, dV/dt of dI/dt of the semiconductor switches, threshold voltage of the semiconductor switches, and/or voltage at the semiconductor switches 56, 54. Slew rate may be controlled by both the present/future operating conditions of the electric machine 14, and/or the present or future operating conditions of the electric propulsion system and/or other systems cooperating with the electric machine 14, e.g., the inverter may be controlled to set the torque and speed of the electric machine 14. The gate controller 38 may use one set of resistances for increasing efficiency in Enhanced Current Output Performance (ECOP) regions, use another set of resistances for peak current, and use the last set of resistances to increase losses in the PIM 16 for use of the hybrid switches 56, 54 individually or in parallel. This may be used to optimize losses in different operation areas by using specific semiconductor switches and slew rates in specific regions. Furthermore, optimization can be done based on using a combination of different semiconductor switches having different slew rates. The gate controller 38 may use the variable slew rates to decrease losses, increase peak performance, and decrease chip/die temperatures during operation of the power electronic system for parallel or individual semiconductor switch operation and/or to protect the semiconductor switches 56, 54 from overvoltage.

Figure 3:
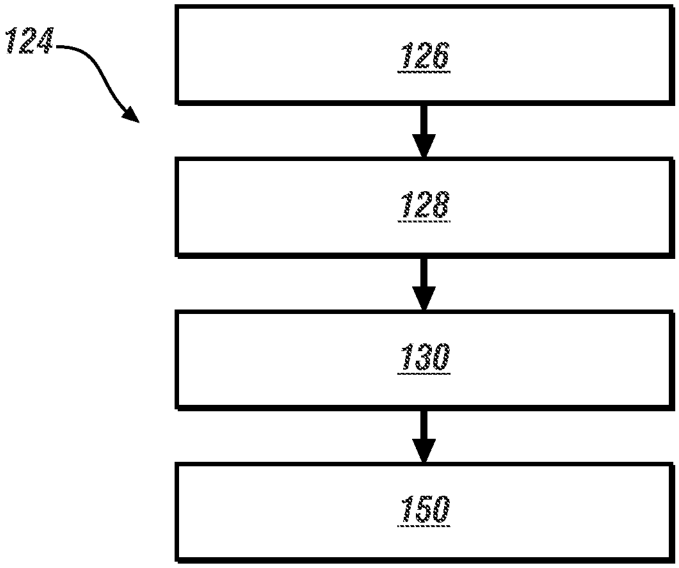
FIG. 3 illustrates a flow diagram, in accordance with the disclosure.

FIG. 3 illustrates a flowchart 124 of a method for variable slew rate powering of an electric machine in accordance with one aspect of the present disclosure. The flowchart 124 may be reduced to practice as one or more algorithms and calibrations. The method is predominantly described with respect to powering an embodiment of the electric machine 14 that is configured for converting an AC input to a mechanical output suitable for propelling a vehicle. However, the present disclosure fully contemplates the method being useful for powering other types of electric machines. Block 126 relates to a performance characteristics process whereby the gate controller 38 or other functioning element determines performance characteristics for a plurality of semiconductor switches 56, 54 included within each of a plurality of hybrid switch power modules 75 configured for converting a DC output 30 to an AC input 32 suitable for powering the electric machine 14. The performance characteristics may relate to a wide variety of parameters, constraints, abilities, and other aspects of the semiconductor switches 56, 54, including those that may differentiate capabilities of the semiconductors switches 56, 54 relative to each other. Depending on the technology of the semiconductor switches 56, 54, one of the semiconductor switches 56, 54 included onboard one of the hybrid switch power modules 75 may be more efficient, less expensive, more reliable, have higher operating boundaries than another one of the semiconductor switches 56, 54 included onboard the same hybrid switch power modules 75. These performance characteristics may be analyzed to determine situations when one of semiconductor switches 56, 54 may be more favored than other semiconductor switches 56, 54 and/or when conditions may warrant use of both semiconductor switches 56, 54 simultaneously.

Block 128 relates to an operating conditions process whereby the gate controller 38 or other functioning element may determine operating conditions of the electric machine 14. The operating conditions may relate to a wide variety of parameters, constraints, abilities, values, and other aspects of the electric machine 14, including those associated with present or ongoing operating conditions and/or those expected to occur in the near future. The operating conditions, for example, may relate to bearing current, motor peak voltage, motor torque, motor speed, temperature, etc. Block 130 relates to a slew rate preference process whereby the gate controller 38 or other functioning element may determine preferences for varying the ON/OFF slew rate of the semiconductor switches 56, 54, and thereby transitioning of the hybrid switch power modules 75 between opened and closed states. The slew rate preference process may include analysis of the performance characteristics associated with the semiconductor switches 56, 54 and the operating conditions of the electric machine 14 to determine whether it is desirable or optimal to prefer a faster slew rate, a slower slew rate, or a custom slew rate. A faster slew rate may result in less losses but at the consequence of less electromagnetic compatibility (EMC), i.e., more electromagnetic interference (EMI), while a slower slew rate may have the opposite result, i.e., more losses but at greater or improved EMC.

Figure 4:
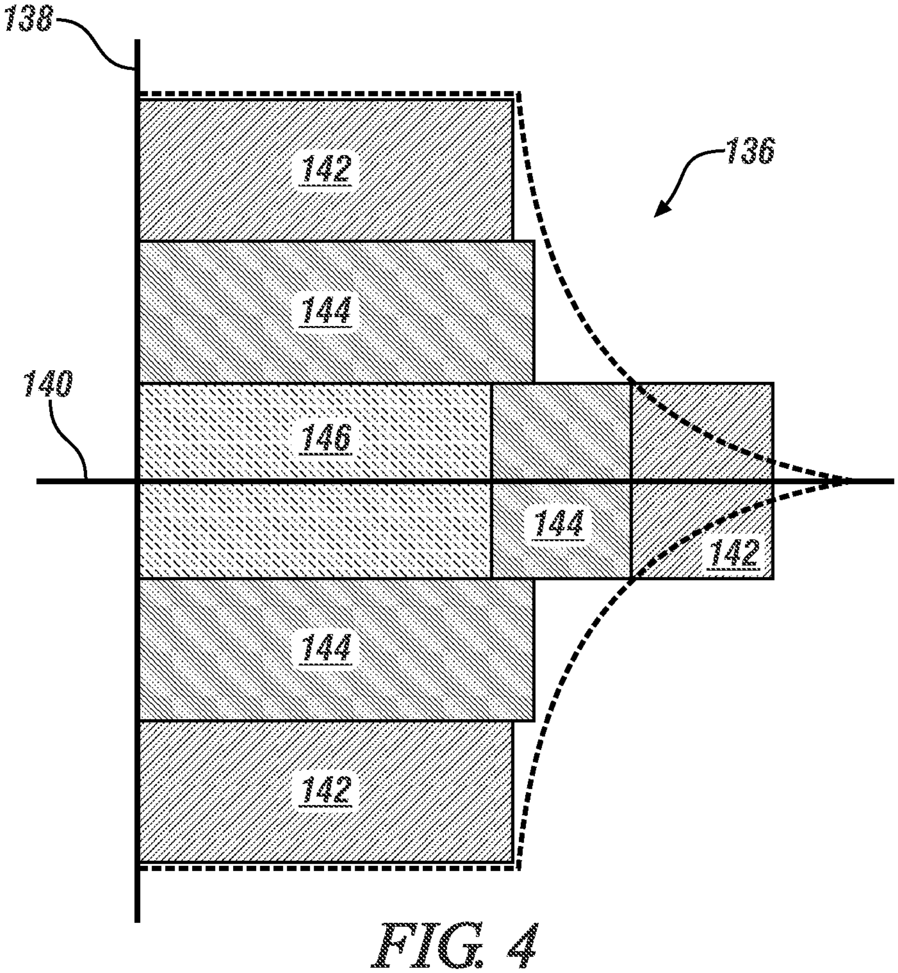
FIG. 4 graphically illustrates a slew rate graph in accordance with an aspect of the present disclosure.

FIG. 4 illustrates a slew rate graph 136 in accordance with one aspect of the present disclosure. The graph includes a vertical axis 138 and a horizontal axis 140 to represent values useful in selecting or differentiating between desired slew rates at certain times.

The values included in the axes 138, 140 may be delineated according to the various performance characteristics of the semiconductor switches 56, 54 and/or the operating conditions of the electric machine 14.

For non-limiting purposes, the vertical axis 138 is described as corresponding with motor torque and the horizontal axis 140 is described as corresponding with motor speed. The graph 136 indicates a plurality of slew rate regions 142, 144, 146 defined relative to boundaries set according to motor torque and speed, however, similar demarcations may be defined and/or the motor torque and speed may be related or extrapolated, according to voltage, current, temperature, etc.

The slew rate regions 142, 144, 146 may correspond with slew rates desired for differing combinations of motor torque and speed, which in the illustrated configuration includes a first region 142, a second region 144, and a third region 146.

The first region 142 may be associated with a slew rate slower than the second region 144 and the second region 144 may be associated with a slew rate slower than the third region 146. The use of three slew rates is presented for non-limiting purposes based on the above-described variable resistance circuits 82, 84 including three different combinations of resistors, i.e., each combination of resistors being associated with a difference in rate.

As one skilled in the art may appreciate, additional granularity in the slew rates may be achieved by including additional resistor combinations in the variable resistance circuits 82, 84 or other capabilities for adjusting biasing of the semiconductor switches 56, 54.

Returning to FIG. 3, Block 150 relates to generating control and slew rate signals for respectively turning ON/OFF the semiconductor switches 56, 54 and the slew rate associated therewith. Depending on the slew rate region 142, 144, 146, the corresponding signals may result in one or both of the semiconductor switches 56, 54 being controlled between ON and OFF states. Returning to FIG. 4, the first region 142 may include both semiconductor switches 56, 54 being in the ON state, which may be referred to as a dual mode, with the resistors set to provide the first slew rate, the second region 144 may include both semiconductor switches 56, 54 being in the ON state with the resistors set to provide the second slew rate, and the third region 146 may include the first semiconductor switch being in the ON state while the second semiconductor switch 54 is in the OFF state with the resistors set to provide the third slew rate. The first, second, and third regions 142, 144, 146 are shown to repeat or be used at multiple locations as the use thereof may be desirable for more than one range of operating conditions. Additional slew rate graphs, charts, lookup tables, algorithms, formulas, and the like may be used to similarly define differing slew rate regions, particularly depending on desired preference. This, for example, may include defining differing slew rate regions as a function of efficiency, optimal loss, non-optimal loss, high loss, EMC, EMI, etc.

As supported above, the variable slew rate gate drive system may be beneficial in mitigating impacts of different turn-on/turn-off characteristics of two device types of semiconductor switches to ensure synchronized switching, controlling two or more different device types for use independently or in parallel, keeping those semiconductor switches within rated operation while achieving higher efficiency by having discrete slew rates for corner case operation of each of the devices individually and/or optimized slew rates for operating regions important for minimal losses, providing gate driver flexibility and configurability that avoids limiting the semiconductors types that can be used in a hybrid switch power module, and/or decreased switching losses. The variable slew rates may be created by having at least two sets of gate resistors per transistor technology for both turn-on and turn-off (4 sets total per technology), such as four sets of selectable gate resistances (Rg) for SiC MOSFET semiconductor switches and four sets of selectable gate resistances for Si IGBT semiconductor switches. The two sets of gate resistors, for turn-on and turn-off, can be used individually or in parallel, creating at least three sets of slew rates per transistor technology for turn-on and three sets for turn-off per transistor technology. The variable slew rates may be used to keep the semiconductor switches with the rated operational boundaries at maximum output current and maximum input voltage, while being able to decrease losses in the regions where the semiconductor switch is used the most. In addition to ensuring the semiconductor switches operate within rated voltage and can be as efficient as possible, the multiple slew rate design may be beneficial with current sharing and balancing between the transistor technologies through controlling turn-on and turn-off delays between the technologies independently to accommodate potential latencies for operation. Additionally, gate drive specifics may be used in selecting gate voltages needed for the semiconductor switches, ensuring the semiconductor switches may be held off, overcurrent protected, and overvoltage protected, optionally with simplification of PWM control.

Figure 5:
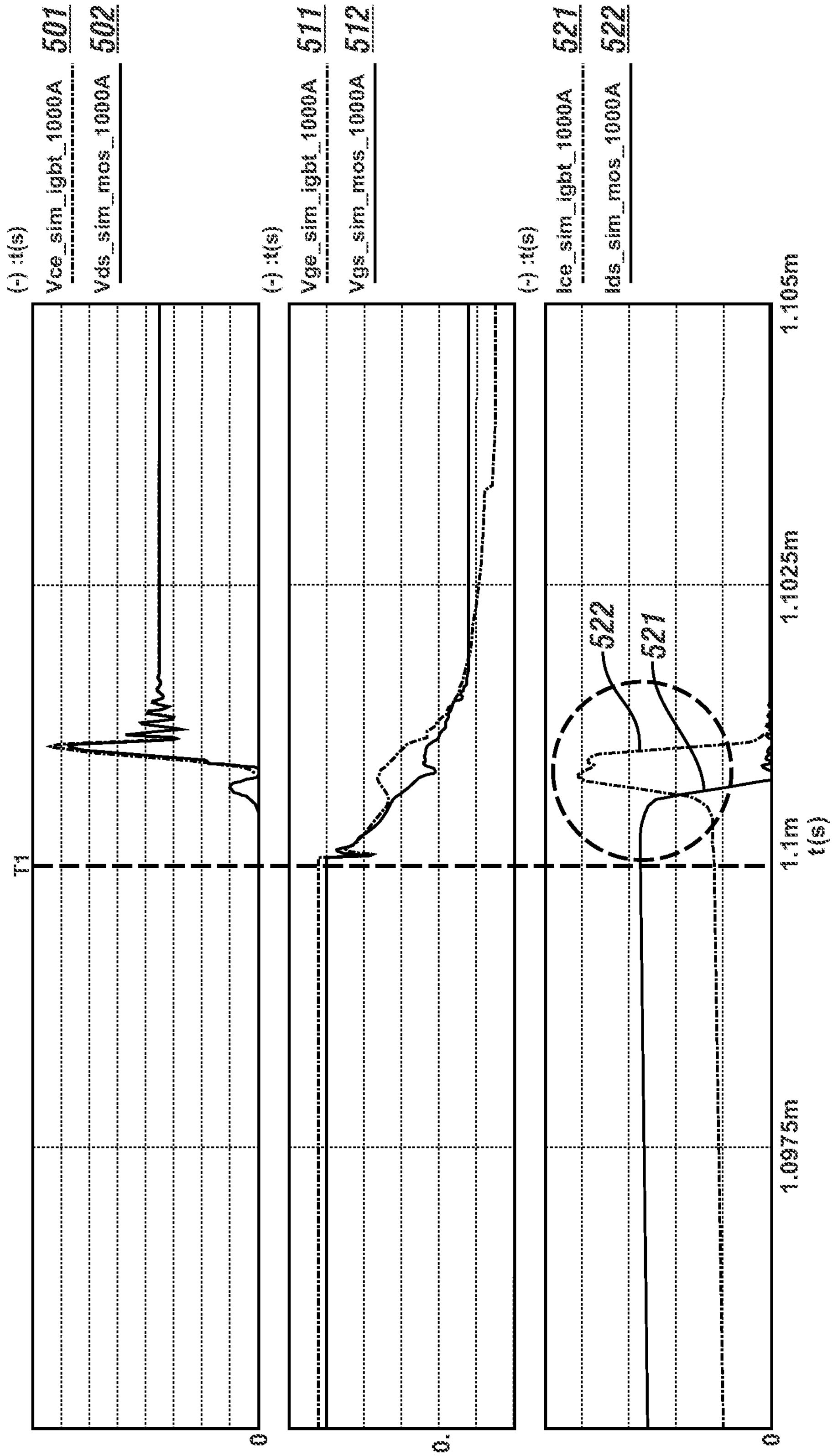
FIG. 5 graphically illustrates switch parameters during an ON/OFF transient for an embodiment of the hybrid switch power module described herein, in accordance with the disclosure.

FIG. 5 graphically illustrates a first input/output voltage, a first gate voltage, and a device current flow during an ON/OFF transient for an embodiment of the hybrid switch power module 75 described herein when the first semiconductor switch is commanded from an ON state to an OFF state at the same time that the second semiconductor switch is commanded from an ON state to an OFF state. As shown the first semiconductor switch is a FET device, and the second semiconductor switch is an IGBT device.

Line 501 represents collector-emitter voltage Vce for the first semiconductor switch, configured as an IGBT, when is commanded from an ON state to an OFF state.

Line 502 represents drain-source voltage Vds for the second semiconductor switch, configured as an FET, when it is commanded from an ON state to an OFF state coinciding with the IGBT.

Line 511 represents gate-emitter voltage Vge for the first semiconductor switch when it is commanded from the ON state to the OFF state.

Line 512 represents the gate-source voltage Vgs for the second semiconductor switch when it is commanded from the ON state to the OFF state.

Line 521 represents the collector-emitter current Ice for the first semiconductor switch when it is commanded from the ON state to the OFF state.

Line 522 represents the drain-source current Ids for the second semiconductor switch when it is commanded from the ON state to the OFF state.

As is appreciated, and illustrated, the FET has a faster switching speed as compared to the IGBT. As a result, and illustrated with regard to lines 522 and 521, the current load being carried by the second semiconductor switch, i.e., the IGBT, surges during the ON/OFF transient due to differences in the switching speeds of the first and second semiconductor switches. Unless addressed, this current load surge across the IGBT during the ON/OFF transient may reduce the service life of the IGBT, or require a more robust or heavy duty IGBT device, with attendant effects on packaging, heat transfer, etc.

The concepts described herein provide for the gate controller 38 to generate a first control signal 77 for controlling the first semiconductor switch 56 via the gate driver 18 and the first variable resistance circuit 82, wherein the first control signal 77 is selected to achieve a first switching transient in the first semiconductor switch 56, and generate a second control signal 79 for controlling the second semiconductor switch 54 via the gate driver 18 and the second variable resistance circuit 84, wherein the second control signal 79 selected to achieve a second switching transient in the second semiconductor switch 54, wherein the gate controller 38 generates the first control signal 77 and the second control signal 79 to synchronize the first switching transient in the first semiconductor switch 56 with the second switching transient in the second semiconductor switch 54. As employed herein the term 'switching transient' refers to an ON/OFF switching event or transition, and/or an OFF/ON switching event or transition.

Figure 6:
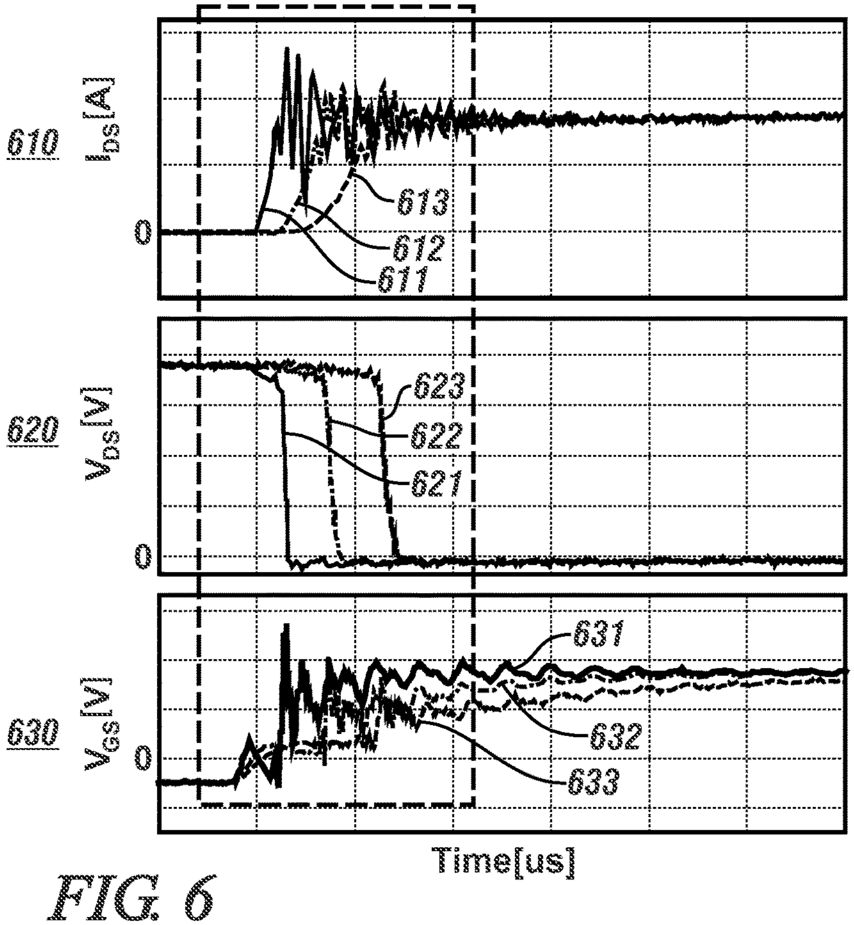
FIG. 6 graphically illustrates, with continued reference to FIGS. 1 through 4, values for drain-source current (IDS), drain-source voltage (VDS), and gate-source voltage (VGS) in relation to time on the horizontal axis for an embodiment of a FET device that may be employed as one of the first and second semiconductor switches of an embodiment of the hybrid switch power module, the gate drive circuit, and the slew rate adjustment routine that are described herein. The graphed data depicts respective values during an OFF/ON transient.

FIG. 6 graphically illustrates, with continued reference to FIGS. 1 through 4, values for drain-source current ($I_{DS}$) 610, drain-source voltage ($V_{DS}$) 620, and gate-source voltage ($V_{GS}$) 630 in relation to time on the horizontal axis for an embodiment of a FET device that may be employed as one of the first and second semiconductor switches 56, 54 of an embodiment of the hybrid switch power module 75, the gate drive circuit 40, and the slew rate adjustment routine 124 that are described herein. The graphed data depicts respective values during an OFF/ON transient. Time-based values for drain-source current ($I_{DS}$) 610, drain-source voltage ($V_{DS}$) 620, and gate-source voltage ($V_{GS}$) 630 are depicted for three levels of resistance R1, R2, R3, wherein the three levels of resistance R1, R2, R3 represent low, medium, and high resistance levels, respectively, and are achieved by control, via the gate driver circuit 40, of one of the first and second variable resistance circuits 82, 84 that connects to one of the semiconductor switches of the hybrid switch power module 75.

The graph associated with the drain-source current ($I_{DS}$) 610 includes first $I_{DS}$ current 611 associated with R1, second $I_{DS}$ current 612 associated with R2, and third $I_{DS}$ current 613 associated with R3, wherein R1 is less than R2, which is less than R3.

The graph associated with the drain-source voltage ($V_{DS}$) 620 includes first $V_{DS}$ voltage 621 associated with R1, second $V_{DS}$ voltage 622 associated with R2, and third $V_{DS}$ voltage 623 associated with R3. The first $V_{DS}$ voltage 621 associated with R1, second $V_{DS}$ voltage 622 associated with R2, and third $V_{DS}$ voltage 623 associated with R3 indicate that there is a delay in the OFF/ON transition, wherein the magnitude of the delay increases with an increase in the resistance, wherein the resistance is controlled via one of the first and second variable resistance circuits 82, 84.

The graph associated with the gate-source voltage (Vas) 630 includes first Vas voltage 631 associated with R1, second Vas voltage 632 associated with R2, and third Vas voltage 633 associated with R3.

The aforementioned graphs depict a switching time delay in the FET device, which can be achieved by controlling, via the gate driver circuit 40, of one of the first and second variable resistance circuits 82, 84 that connects to one of the first and second semiconductor switches 56, 54 of the hybrid switch power module 75.

As such, in response to the first slew rate command 112 originating from the gate controller 38, the gate driver circuit 40 is able to control one of the first and second variable resistance circuits 82, 84 that connects to one of the first and second semiconductor switches 56, 54 of the hybrid switch power module 75 via a first control signal that controls a first slew rate of the one of the first and second semiconductor switches 56, 54. The first slew rate command 112 for controlling the first of the semiconductor switches is selected to achieve a first switching transient that includes a first switching time delay in the first of the first and second semiconductor switches 56, 54.

In like manner, and in response to the second slew rate command 114 originating from the gate controller 38, the gate driver circuit 40 is able to control the other of the first and second variable resistance circuits 82, 84 that connects to the other of the of the first and second semiconductor switches 56, 54 of the hybrid switch power module 75 via a second control signal that controls a second slew rate of the other of the first and second semiconductor switches 56, 54. The second slew rate command 114 for controlling the second semiconductor switch is selected to achieve a second switching transient in the form of a second switching time delay in the other of the first and second semiconductor switches 56, 54.

The gate controller 38 controls the first slew rate command 112 and the second slew rate command 114 to synchronize the first switching transient in the first of the first and second semiconductor switches 56, 54 with the second switching transient in the second of the first and second semiconductor switches 56, 54.

FIGS. 7-1, 7-2, 7-3, and 7-4 graphically illustrate examples of first and second PWM control signals respectively, for controlling the first and second PWM commands for the first and second semiconductor switches 56, 54 of an embodiment of the hybrid switch power module 75 during a single PWM cycle including an OFF-ON transient 701 and an ON-OFF transient 702, so as to synchronize the first switching transient in the first of the first and second semiconductor switches 56, 54 with the second switching transient in the second of the first and second semiconductor switches 56, 54.

Figures 1, 7:
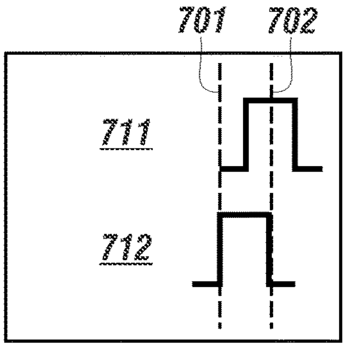
Figures 2, 7:
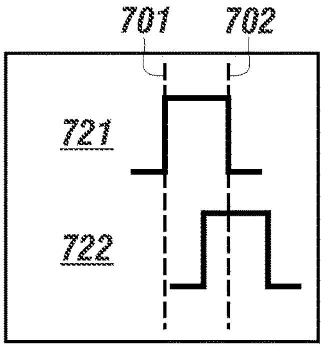
Figures 3, 7:
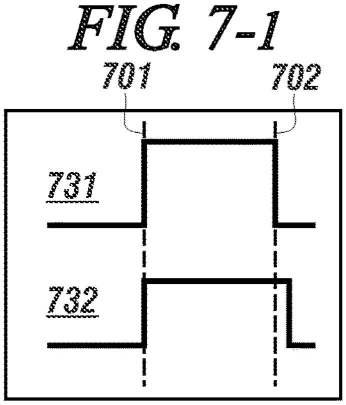
Figures 4, 7:
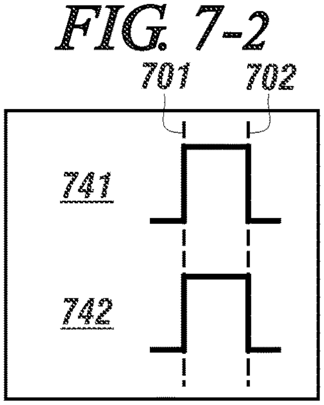

FIG. 7-1 depicts a first example of first and second PWM control signals 711, 712 respectively, for controlling the first and second PWM commands for the first and second semiconductor switches 56, 54 of an embodiment of the hybrid switch power module 75 during a single PWM cycle including an OFF-ON transient 701 and an ON-OFF transient 702, so as to synchronize the first switching transient in the first of the first and second semiconductor switches 56, 54 with the second switching transient in the second of the first and second semiconductor switches 56, 54. In this embodiment, the first PWM control signal 711 includes a first frequency and a first duty cycle period, and the second PWM control signal 712 includes a second frequency and a second duty cycle period. The first frequency is equal to the second frequency. The first duty cycle period is equal to the second duty cycle period. The first duty cycle lags the second duty cycle by a period of time sufficient to synchronize the first switching transient in the first of the first and second semiconductor switches 56, 54 with the second switching transient in the second of the first and second semiconductor switches 56, 54.

FIG. 7-2 depicts a second example of first and second PWM control signals 721, 722 respectively, for controlling the first and second PWM commands for the first and second semiconductor switches 56, 54 of an embodiment of the hybrid switch power module 75 during a single PWM cycle including an OFF-ON transient 701 and an ON-OFF transient 702, so as to synchronize the first switching transient in the first of the first and second semiconductor switches 56, 54 with the second switching transient in the second of the first and second semiconductor switches 56, 54. In this embodiment, the first PWM control signal 721 includes a first frequency and a first duty cycle, and the second PWM control signal 722 includes a second frequency and a second duty cycle. The first frequency is equal to the second frequency. The first duty cycle period is equal to the second duty cycle period. The first duty cycle leads the second duty cycle by a period of time sufficient to synchronize the first switching transient in the first of the first and second semiconductor switches 56, 54 with the second switching transient in the second of the first and second semiconductor switches 56, 54.

FIG. 7-3 depicts a third example of first and second PWM control signals 731, 732 respectively, for controlling the first and second PWM commands for the first and second semiconductor switches 56, 54 of an embodiment of the hybrid switch power module 75 during a single PWM cycle including an OFF-ON transient 701 and an ON-OFF transient 702, so as to synchronize the first switching transient in the first of the first and second semiconductor switches 56, 54 with the second switching transient in the second of the first and second semiconductor switches 56, 54. In this embodiment, the first PWM control signal 721 includes a first frequency and a first duty cycle, and the second PWM control signal 722 includes a second frequency and a second duty cycle. The first frequency is equal to the second frequency. The first duty cycle period is less than the second duty cycle period. The OFF/ON transient of the second PWM control signal 722 is synchronized with the OFF/ON transient of the first PWM control signal 721, however the ON/OFF transient of the second PWM control signal 722 lags the ON/OFF transient of the first PWM control signal 721. The first and second PWM control signals are selected to synchronize the first switching transient in the first of the first and second semiconductor switches 56, 54 with the second switching transient in the second of the first and second semiconductor switches 56, 54.

FIG. 7-4 depicts a another example of first and second PWM control signals 741, 742 respectively, for controlling the first and second PWM commands for the first and second semiconductor switches 56, 54 of an embodiment of the hybrid switch power module 75 during a single PWM cycle including an OFF-ON transient 701 and an ON-OFF transient 702, so as to synchronize the first switching transient in the first of the first and second semiconductor switches 56, 54 with the second switching transient in the second of the first and second semiconductor switches 56, 54. In this embodiment, the first PWM control signal 721 includes a first frequency and a first duty cycle, and the second PWM control signal 722 includes a second frequency and a second duty cycle. The first frequency is equal to the second frequency. The first duty cycle period is equal to the second duty cycle period. The first duty cycle is equal to the second duty cycle. The first switching transient in the first of the first and second semiconductor switches 56, 54 is synchronized with the second switching transient in the second of the first and second semiconductor switches 56, 54 by controlling the first and second slew rate signals 112, 114.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A control system for a multi-phase inverter, comprising:

a gate controller, a gate drive circuit, and a hybrid switch power module;

wherein the hybrid switch power module is integrated into a phase leg of the multi-phase inverter;

wherein the hybrid switch power module includes a first semiconductor switch connected in parallel with a second semiconductor switch between a power rail and an AC power link of the phase leg of the multi-phase inverter, the first semiconductor switch having a first set of performance characteristics and the second semiconductor switch having a second set of performance characteristics differing at least partially from the first set of performance characteristics;

wherein the gate drive circuit includes a gate driver, a first variable resistance circuit that is operatively connected to the first semiconductor switch, and a second variable resistance circuit that is operatively connected to the second semiconductor switch;

wherein the gate controller generates a first control signal for controlling the first semiconductor switch via the gate driver and the first variable resistance circuit, the first control signal selected to achieve a first switching transient in the first semiconductor switch;

wherein the gate controller generates a second control signal for controlling the second semiconductor switch via the gate driver and the second variable resistance circuit, the second control signal selected to achieve a second switching transient in the second semiconductor switch; and wherein the gate controller generates the first control signal and the second control signal to synchronize the first switching transient in the first semiconductor switch with the second switching transient in the second semiconductor switch.

2. The control system of claim 1, wherein the first control signal for controlling the first semiconductor switch to achieve the first switching transient in the first semiconductor switch comprises a first slew rate command;

wherein the second control signal for controlling the second semiconductor switch to achieve the second switching transient in the second semiconductor switch comprises a second slew rate command; and wherein the gate controller controls the first slew rate command and the second slew rate command to synchronize the first switching transient in the first semiconductor switch with the second switching transient in the second semiconductor switch.

3. The control system of claim 2, comprising:

wherein the gate controller generates the first control signal to control the first variable resistance circuit to control the first slew rate to achieve the first switching transient in the first semiconductor switch; and wherein the gate controller generates the second control signal to control the second variable resistance circuit to control the second slew rate to achieve the second switching transient in the second semiconductor switch.

4. The control system of claim 2, wherein the first switching transient comprises a first time-rate change in voltage (dV/dt) across the first semiconductor switch, and wherein the second switching transient comprises a second time-rate change in voltage (dV/dt) across the second semiconductor switch.

5. The control system of claim 2, wherein the first switching transient comprises a first time-rate change in current (dI/dt) across the first semiconductor switch, and wherein the second switching transient comprises a second time-rate change in current (dI/dt) across the second semiconductor switch.

6. The control system of claim 1, wherein the first control signal for controlling the first semiconductor switch to achieve the first switching transient in the first semiconductor switch comprises a first pulsewidth-modulated (PWM) signal;

wherein the second control signal for controlling the second semiconductor switch to achieve the second switching transient in the second semiconductor switch comprises a second PWM signal; and wherein the gate controller controls the first PWM signal and the second PWM signal to synchronize the first switching transient in the first semiconductor switch with the second switching transient in the second semiconductor switch.

7. The control system of claim 6, comprising:

wherein the gate controller generates the first control signal to control the first PWM signal to achieve the first switching transient in the first semiconductor switch; and wherein the gate controller generates the second control signal to control the second PWM signal to achieve the second switching transient in the second semiconductor switch.

8. The control system of claim 7, wherein the first PWM signal includes a first frequency and a first duty cycle, wherein the second PWM signal includes a second frequency and a second duty cycle; wherein the first frequency is equal to the second frequency, wherein the first duty cycle is equal to the second duty cycle, and wherein the first duty cycle lags the second duty cycle.

9. The control system of claim 7, wherein the first PWM signal includes a first frequency and a first duty cycle, wherein the second PWM signal includes a second frequency and a second duty cycle; wherein the first frequency is equal to the second frequency, wherein the first duty cycle is equal to the second duty cycle, and wherein the first duty cycle leads the second duty cycle.

10. The control system of claim 7, wherein the first PWM signal includes a first frequency and a first duty cycle, wherein the second PWM signal includes a second frequency and a second duty cycle; wherein the first frequency is equal to the second frequency, and wherein the first duty cycle is greater than the second duty cycle.

11. The control system of claim 7, wherein the first PWM signal includes a first frequency and a first duty cycle, wherein the second PWM signal includes a second frequency and a second duty cycle; wherein the first frequency is equal to the second frequency, and wherein the first duty cycle is less than the second duty cycle.

12. The control system of claim 7, wherein the first PWM signal includes a first frequency and a first duty cycle, wherein the second PWM signal is OFF.

13. The control system of claim 1, wherein the first semiconductor switch of the hybrid switch power module comprises an Insulated Gate Bipolar Transistor (IGBT), and second semiconductor switch comprises a Metal-Oxide-Semiconductor Field-Effect Transistor (MOSFET).

14. The control system of claim 1, wherein the first semiconductor switch of the hybrid switch power module comprises a silicon-based device, and wherein the second semiconductor switch comprises a wide bandgap (WBG) device.

15. The control system of claim 1, wherein the power rail comprises a positive high-voltage power link, and wherein the hybrid switch power module is connected between the positive high-voltage power link and the AC power link of the phase leg of the multi-phase inverter.

16. The control system of claim 1, wherein the power rail comprises a negative high-voltage power link, and wherein the hybrid switch power module is connected between the negative high-voltage power link and the AC power link of the phase leg of the multi-phase inverter.

17. The control system of claim 1, wherein the first switching transient in the first semiconductor switch comprises an ON/OFF transition, and wherein the second switching transient in the second semiconductor switch comprises an ON/OFF transition.

18. The control system of claim 1, wherein the first switching transient in the first semiconductor switch comprises an OFF/ON transition, and wherein the second switching transient in the second semiconductor switch comprises an OFF/ON transition.

19. A method for controlling a multi-phase power inverter, comprising:

integrating a hybrid switch power module into a phase leg of the multi-phase power inverter;

generating, via a gate controller, a first control signal for controlling a first semiconductor switch of the hybrid switch power module via gate driver and a first variable resistance circuit, the first control signal selected to achieve a first switching transient in the first semiconductor switch;

generating, via the gate controller, a second control signal for controlling a second semiconductor switch of the hybrid switch power module via the gate driver and a second variable resistance circuit, the second control signal selected to achieve a second switching transient in the second semiconductor switch; and generating the first control signal and the second control signal to synchronize the first switching transient in the first semiconductor switch with the second switching transient in the second semiconductor switch;

wherein the first control signal for controlling the first semiconductor switch to achieve the first switching transient in the first semiconductor switch includes a first slew rate command; and wherein the second control signal for controlling the second semiconductor switch to achieve the second switching transient in the second semiconductor switch includes a second slew rate command.

20. A vehicle system, comprising:

a gate drive system, a multi-phase power inverter, and an electric machine;

the multi-phase power inverter being operatively connected to the electric machine via a plurality of phase legs;

the gate drive system including a gate controller, a gate drive circuit, and a plurality of hybrid switch power modules;

wherein the hybrid switch power modules are integrated into the plurality of phase legs of the multi-phase inverter;

wherein each of the hybrid switch power modules includes a first semiconductor switch connected in parallel with a second semiconductor switch between a power rail and an AC power link of the phase leg of the multi-phase inverter, the first semiconductor switch having a first set of performance characteristics and the second semiconductor switch having a second set of performance characteristics differing at least partially from the first set of performance characteristics;

wherein the gate drive circuit includes a gate driver, a first variable resistance circuit that is operatively connected to the first semiconductor switch, and a second variable resistance circuit that is operatively connected to the second semiconductor switch;

wherein the gate controller generates a first control signal for controlling the first semiconductor switch via the gate driver and the first variable resistance circuit, the first control signal selected to achieve a first switching transient in the first semiconductor switch;

wherein the gate controller generates a second control signal for controlling the second semiconductor switch via the gate driver and the second variable resistance circuit, the second control signal selected to achieve a second switching transient in the second semiconductor switch; and wherein the gate controller generates the first control signal and the second control signal to synchronize the first switching transient in the first semiconductor switch with the second switching transient in the second semiconductor switch.

* * * * *